(12) United States Patent
Muller et al.

(10) Patent No.: US 8,670,747 B1
(45) Date of Patent: Mar. 11, 2014

(54) MOBILE NETWORK CONNECTIVITY

(75) Inventors: Donald Walter Muller, League City, TX (US); Nathaniel Shane Gashette, Missouri City, TX (US)

(73) Assignee: The Boeing Company, Chicago, IL (US)

(*) Notice: Subject to any disclaimer, the term of this patent is extended or adjusted under 35 U.S.C. 154(b) by 0 days.

(21) Appl. No.: 13/451,387

(22) Filed: Apr. 19, 2012

(51) Int. Cl.
*H04M 1/66* (2006.01)

(52) U.S. Cl.
USPC ........ 455/410; 455/411; 455/422.1; 713/168; 380/270

(58) Field of Classification Search
USPC ......... 455/410, 411, 422.1; 713/168; 380/270
See application file for complete search history.

(56) References Cited

U.S. PATENT DOCUMENTS

| | | | |
|---|---|---|---|
| 2006/0179307 A1* | 8/2006 | Stieglitz et al. | 713/168 |
| 2007/0147298 A1* | 6/2007 | Miao et al. | 370/331 |
| 2007/0250713 A1* | 10/2007 | Rahman et al. | 713/171 |
| 2008/0112362 A1* | 5/2008 | Korus | 370/331 |
| 2009/0073993 A1 | 3/2009 | Qureshi et al. | |
| 2010/0296507 A1* | 11/2010 | Masiyowski et al. | 370/352 |
| 2011/0103393 A1 | 5/2011 | Meier et al. | |
| 2013/0152206 A1* | 6/2013 | Staubly | 726/26 |

OTHER PUBLICATIONS

"Mobile Cellular Networks in Military Use," Defense Update International Online Defense Magazine, Year 2005, Issue 1, Oct. 2005, 3 Pages, accessed Apr. 17, 2012, http://defense-update.com/features/du-1-05/c4-mobile.htm.

"Military Wireless Data Networks," Defense Update International Online Defense Magazine, Year 2005, Issue 1, Oct. 2005, 2 Pages, accessed Apr. 14, 2012, http://defense-update.com/features/du-1-05/c4-data.htm.

"Tactical Mobile Broadband Networks," Defense Update International Online Defense Magazine, Year 2005, Issue 1, Oct. 2005, 2 Pages, accessed Apr. 17, 2012, http://defense-update.com/features/du-1-05/c4-data1.htm.

"Tactical Satellite Communication Networks," Defense Update International Online Defense Magazine, Year 2005, Issue 1, Sep. 2006, 3 Pages, accessed Apr. 17, 2012, http://defense-update.com/features/du-1-05/c4-satcom.htm.

"Tactical Mobile Mesh Networking," TrellisWare Technologies, copyright 2012, 2 Pages, accessed Apr. 17, 2012, http://www.trellisware.com/technologies/mobilenet.htm.

* cited by examiner

*Primary Examiner* — Danh Le
(74) *Attorney, Agent, or Firm* — Yee & Associates, P.C.

(57) ABSTRACT

A system and method for communication between a number of mobile devices. Wireless connectivity is established between the number of mobile devices and a mobile access point to form a mobile network. Information is exchanged between the number of mobile devices via the wireless connectivity between the number of mobile devices and the mobile access point. Wireless connectivity also may be established between the mobile access point and a number of other mobile networks to form a mesh of mobile networks. Information may be exchanged between the number of mobile devices and the number of other mobile networks via the wireless connectivity between the number of mobile devices and the mobile access point.

18 Claims, 7 Drawing Sheets

FIG. 7
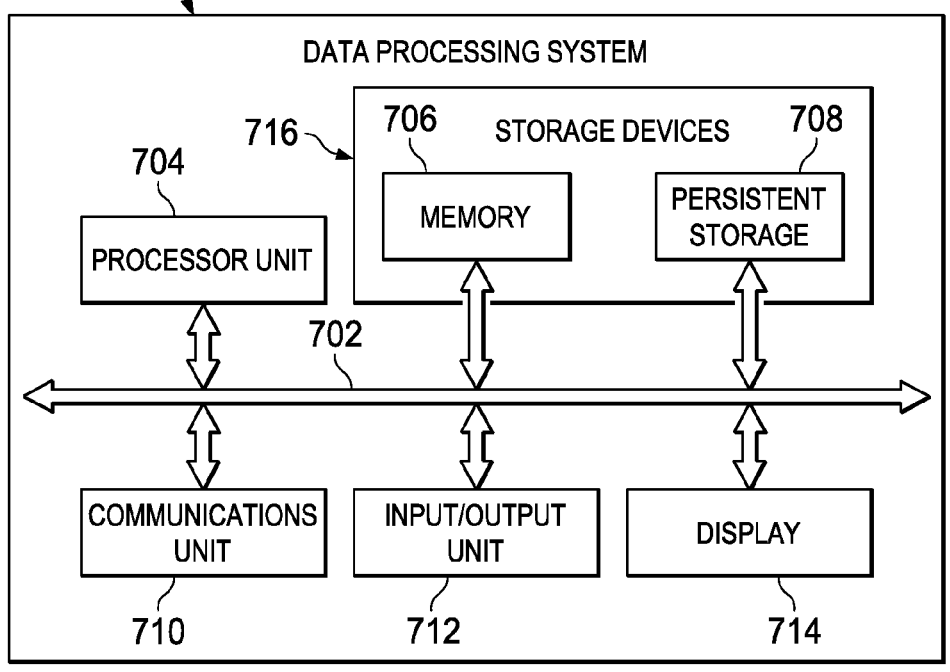
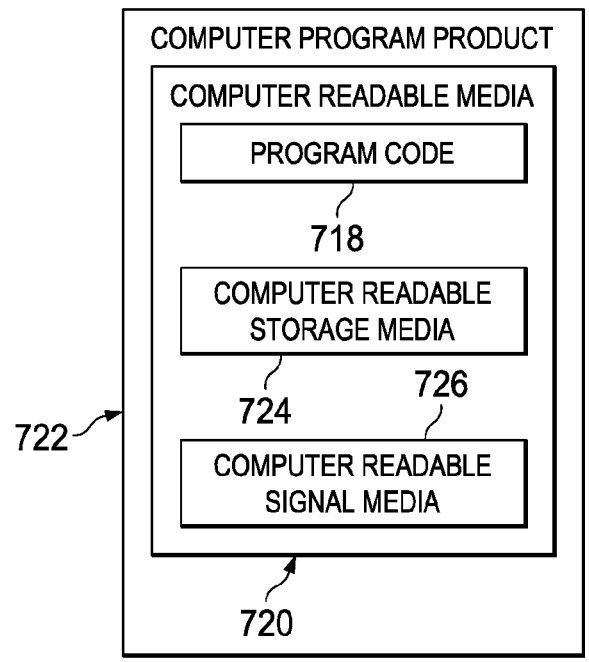

MOBILE NETWORK CONNECTIVITY

BACKGROUND INFORMATION

1. Field

The present disclosure relates generally to networks for providing voice and data connectivity for mobile devices. More particularly, the present disclosure relates to mobile networks for providing voice and data connectivity for mobile devices in an operational environment where a conventional communications network infrastructure and access to external communications network resources may be limited or not available.

2. Background

Communications may be an important part of any successful operation involving the coordinated efforts of various personnel and machines. Various communications devices and systems, including mobile communications devices, may be used to provide communications between and among various personnel and machines that may be working at various locations in an operational environment. In many cases, communications between and among personnel and machines in an operational environment may rely on existing communications system infrastructures in the operational environment and access to communications network resources outside of the operational environment.

For example, communications between and among personnel and machines performing various private or governmental operations in a modern city may rely on existing communications system infrastructures in the city. Personnel performing various operations in the city may use telephones connected to an existing land-line public switched telephone network, PSTN, in the city for voice communications. Data communications for such operations may be provided using computers or other devices connected to the public switched telephone network via modems or using other wired or wireless data networks that may be established in the city. Cellular telephones and other wireless mobile devices may be used for voice and data communications between and among the various personnel and machines performing operations in the city. Such wireless mobile devices may rely on existing cellular telephone network infrastructures in the city. Such infrastructures may include a number of cellular telephone network base stations and antennas that may be mounted on towers or other structures throughout the city.

The existing communications system infrastructures in a modern city may provide for both communications between and among personnel and machines performing operations in the city and connectivity to various resources outside of the city. For example, the existing communications system infrastructures in a modern city may provide for communications between and among personnel and machines operating in the city and personnel and machines at various locations throughout the world via networks such as the Internet.

In some cases, use of an existing communications system infrastructure in a city or other operational environment may require such connectivity to remote resources. For example, establishing connectivity between a user device and an existing cellular telephone or other communications network infrastructure in an operational environment may include a process for confirming the identity of the user or the user device and for determining whether the user or user device is allowed to connect to the network. This process may be performed by remote network resources that are located outside of the operational environment, using data that is stored at a remote location outside of the operational environment, or both.

In some operational environments, however, there may be no existing, reliable, or available communications system infrastructures. For example, in some environments where personnel and machines are performing various operations, no adequate communications system infrastructure may ever have been established. In other cases, a communications system infrastructure in a particular operational environment may have been destroyed or damaged by acts of man, nature, or both. As another example, access to the existing communications system infrastructure in a particular operational environment may be blocked or may not be used for security reasons.

Communications between and among personnel and machines in an operational environment where there is no existing, reliable, or available communications system infrastructure may be desired for the effective and efficient performance of various operations in such an environment. For example, personnel and machines performing various military, disaster relief, search and rescue, exploration, and other operations often may operate in such an environment. Communications between personnel and machines operating in such an environment and various personnel, machines, and resources located outside of such an environment also may be desired for the effective and efficient performance of various operations.

Organizations that may be required to perform various operations in environments where there may be no existing, reliable, or available communications system infrastructures have developed their own communications devices and systems to provide for communications between and among their personnel and machines that may be operating in such environments. For example, communication between and among military forces is desirable for command and control of combat, combat support, and combat service support operations among military ground, sea, and air forces. Currently, there are many radio systems that are used to provide voice and other communications for military forces in a tactical environment where there may be no existing, reliable, or available communications system infrastructures. The Single Channel Ground and Airborne Radio System, SINCGARS, is an example of a radio currently used by United States and allied military forces. These radios handle voice and data communications and are designed to be reliable, secure, and easily maintained. Vehicle-mount, backpack, airborne, and handheld versions of these radios are available. The Multiband Inter/Intra Team Radio, MBITR, is an example of a handheld, secure, multiband, tactical radio that is currently in use with military forces around the world.

Current tactical radio systems provide relatively low bandwidth in comparison to the bandwidth provided by commercial wireless communications networks, such as Wi-Fi and cellular telephone networks. Furthermore, current tactical radio systems are configured to provide connectivity between radios that are part of a particular tactical radio system and, perhaps, a limited number of other tactical radio systems. Therefore, current tactical radio systems may place undesired limits on the types and sources of data that may be exchanged by such systems.

Commercial wireless communications systems, such as cellular telephone networks, may provide a higher bandwidth than current tactical radio systems. Furthermore, such systems may allow a user to exchange voice data and various other types of data with a virtually unlimited number of various data resources using a mobile device, such as a cellular telephone or other mobile device. However, current commercial wireless communications devices and systems may rely on a communications system infrastructure that may not be available in tactical or other operational environments.

Accordingly, it would be beneficial to have a method and apparatus that takes into account one or more of the issues discussed above as well as possibly other issues.

SUMMARY

An illustrative embodiment of the present disclosure provides a communication system comprising a number of mobile devices, a mobile access point, and a cross domain guard. The mobile access point is configured to wirelessly exchange information with the number of mobile devices and to control an exchange of information between the number of mobile devices via the mobile access point. The cross domain guard is configured to exchange information between a first security domain comprising the mobile access point and the number of mobile devices and a second security domain.

Another illustrative embodiment of the present disclosure provides a method for communication between a number of mobile devices. Wireless connectivity is established between the number of mobile devices and a mobile access point to form a mobile network. Information is exchanged between the number of mobile devices via the wireless connectivity between the number of mobile devices and the mobile access point. Wireless connectivity also may be established between the mobile access point and a number of other mobile networks to form a mesh of mobile networks. Information may be exchanged between the number of mobile devices and the number of other mobile networks via the wireless connectivity between the number of mobile devices and the mobile access point.

Another illustrative embodiment of the present disclosure provides an apparatus comprising a wireless transceiver and a processor unit. The transceiver is selected from a Wi-Fi transceiver and is configured to exchange information with a number of mobile devices via Wi-Fi and a cellular transceiver configured to exchange information with the number of mobile devices via cellular radio. The processor unit is configured to control an exchange of information between the number of mobile devices. The apparatus is mobile.

The features, functions, and benefits may be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives, and features thereof will best be understood by reference to the following detailed description of illustrative embodiments of the present disclosure when read in conjunction with the accompanying drawings, wherein:

FIG. 7 is an illustration of a data processing system in accordance with an illustrative embodiment.

DETAILED DESCRIPTION

Figure 1:
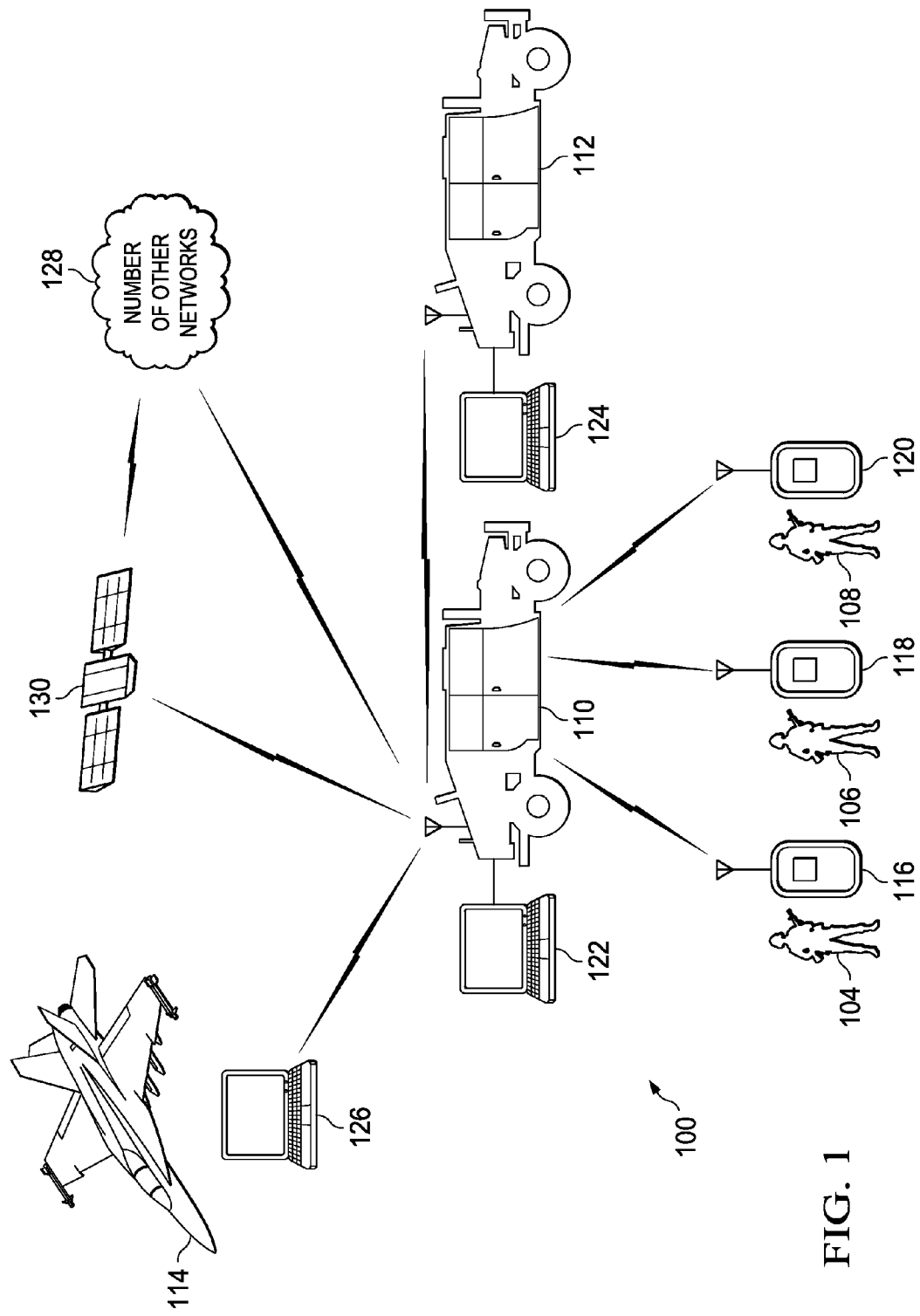
FIG. 1 is an illustration of mobile network connectivity in an operational environment in accordance with an illustrative embodiment.

The different illustrative embodiments recognize and take into account a number of different considerations. "A number", as used herein with reference to items, means one or more items. For example, "a number of different considerations" means one or more different considerations.

The different illustrative embodiments recognize and take into account that personnel and machines performing various operations in an operational environment may be both users of information and sources of potentially useful information. For example, without limitation, command and control information may be provided to a soldier or other personnel to direct operations in a tactical environment. Other information may be provided to the soldier or other personnel to help the soldier or other personnel to complete a mission in the tactical environment. The soldier or other personnel or autonomous machines may acquire intelligence or other information while operating in the tactical environment. This information may be useful to other personnel or autonomous machines within or outside of the tactical environment.

The different illustrative embodiments also recognize and take into account various limitations of current communications systems for providing information to and from personnel and machines in operational environments where conventional commercial communications system infrastructures are not available. For example, the different illustrative embodiments recognize and take into account that the bandwidth provided by current tactical radio systems for military operations may place an undesired limit on the amount and type of information that may be provided to and received from a soldier, other personnel, or autonomous machines operating in a tactical environment. The different illustrative embodiments recognize and take into account that current tactical radio systems may place an undesired limit on the devices and data networks with which a soldier or other personnel operating in a tactical environment may exchange data. Thus, current tactical radio systems may limit the sources of potentially useful information that may be accessed by a soldier or other personnel in a tactical environment. The different illustrative embodiments also recognize and take into account that current radio systems for use in a tactical environment may not support data communications that enable command and control at the level of an individual soldier.

The different illustrative embodiments recognize and take into account that conventional commercial communications networks and devices may provide greater bandwidth than may be provided by current tactical radio systems and other systems for providing communications in operational environments where conventional commercial communications system infrastructures are not available. Conventional commercial communications networks may allow a user to exchange various types of information with a number of other users and various sources using a handheld or other device. For example, without limitation, a Wi-Fi, cellular telephone, or other network may allow users to exchange text, audio, still image, video, and other information or combinations of information with other users or sources of information. The other users or sources of information may be at various local or remote locations that may be accessible by or through the network. The availability of a satellite communications layer on the network may allow information to be exchanged with or obtained from users or other sources of information located throughout the world. Various handheld, mobile, or other user devices may be used to receive or send various types of information via commercial communications networks. For example, without limitation, such user devices may include cellular telephones or other handheld devices, laptop, tablet, or other computer devices, or other devices.

The different illustrative embodiments recognize and take into account, however, that conventional commercial communications networks and devices may rely on communications network infrastructures that may not be available or accessible in many operational environments. For example, conventional cellular telephone networks may rely on base stations or nodes that may include antennas and other communications network infrastructure devices, such as radio network controllers, that may be mounted on towers or other fixed structures. Many operational environments may not be within the range of existing cellular telephone network towers for the use of conventional cellular telephones and other user devices. Furthermore, extending or establishing conventional communications network infrastructures in an operational environment may be time consuming and may not be possible or practical in some operational environments for logistical or tactical reasons. For example, in many cases it may be desirable to provide communications connectivity for personnel and machines in an operational environment as soon as the personnel and machines enter the operational environment to perform a mission, and thus well before conventional communications network infrastructures can be established in the operational environment. As another example, conventional fixed communications network infrastructures, such as cellular telephone network towers, may be too vulnerable to attack or may require too much protection for use in some operational environments.

One or more of the illustrative embodiments provides broad-band data connectivity for a number of mobile user nodes. The mobile user nodes may include handheld communications devices, such as cellular telephones, or other devices used for communications by personnel in an operational environment. The user nodes also may include autonomous nodes associated with machines in the operational environment. A mobile access point provides connectivity for the exchange of data between the mobile user nodes. The mobile user nodes and the mobile access point together form a mobile network. Connectivity may be established between multiple mobile networks to form a mesh. The mobile access point also may provide connectivity for the mobile user nodes in a mobile network, or for the mobile user nodes and other mobile access points in a mesh, to a number of other communications networks, such as a cellular telephone network. A cross domain guard may be provided for the exchange of information between the mobile network and various different security domains. Different security domains may generally refer to different groups of devices that may have different levels of access or different levels of sensitivity of information. For example, without limitation, the cross domain guard may be configured to exchange information between an unclassified domain and a classified domain. The security domains may be military or other government security domains or security domains of other entities.

Turning now to FIG. 1, an illustration of mobile network connectivity in an operational environment is depicted in accordance with an illustrative embodiment. Operational environment 100 may be any area in which any operations are performed by mobile personnel, mobile machines, or both.

For example, without limitation, operations performed by mobile personnel, mobile machines, or both in operational environment 100 may include military operations, disaster recovery operations, search and rescue operations, exploration operations, other operations, or various combinations of operations. In any case, communications between and among personnel and machines in operational environment 100 and between personnel and machines in operational environment 100 and personnel or information sources outside of operational environment 100 may be desirable for the effective and efficient performance of operations in operational environment 100.

Operational environment 100 may be an area in which conventional communications system infrastructures are not available for use by the personnel and machines performing operations in operational environment 100. In this case, operational environment 100 may be referred to as an austere environment. For example, without limitation, no adequate communications system infrastructures may ever have been established in operational environment 100. In other cases, communications system infrastructures in operational environment 100 may have been destroyed or damaged by acts of man, nature, or both. As another example, in some cases, access to existing communications system infrastructures in operational environment 100 may be blocked or may not be used by personnel and machines in operational environment 100 for security reasons.

In this example, operational environment 100 may be any area in which operations are performed by soldiers or other military personnel either alone or in combination with various mobile machines. For example, soldiers 104, 106, and 108, may be operating in operational environment 100 to perform a military mission or other mission. In this case, operational environment 100 may be referred to as a tactical environment.

Vehicles 110, 112, and 114 are examples of mobile machines that also may be operating in operational environment 100. For example, without limitation, vehicles 110, 112, and 114 may include military or other vehicles that are configured to support operations by soldiers 104, 106, and 108 in operational environment 100. In this example, vehicles 110 and 112 are ground vehicles and vehicle 114 is an air vehicle. For example, without limitation, vehicle 114 may be a fixed or rotary wing aircraft; or a lighter than air aircraft. Vehicles 110, 112, and 114 may be manned or unmanned. Unmanned vehicles or other unmanned mobile machines performing operations in operational environment 100 may be referred to as autonomous mobile machines.

In this example, vehicle 110 may be a vehicle that is associated with soldiers 104, 106, and 108. For example, vehicle 110 may be a resource of a platoon or other unit to which soldiers 104, 106, and 108 are assigned. Vehicles 112 and 114 also may be resources of the unit to which soldiers 104, 106, and 108 are assigned or may be resources of other military units or other organizations operating in operational environment 100.

In accordance with an illustrative embodiment, soldiers 104, 106, and 108 may use various types of information from various information sources to perform their mission in operational environment 100 in an effective and efficient manner. For example, without limitation, such information may include command, control, and other information. Such information may be provided from information sources that may be located in operational environment 100, outside of operational environment 100, or both.

Soldiers 104, 106, and 108 also may be sources of useful information. For example, soldiers 104, 106, 108 may obtain intelligence or other potentially useful information while performing their mission in operational environment 100. Such information may be useful for the operations being performed in operational environment 100, for uses outside of operational environment 100, or both.

Vehicles 110, 112, and 114 also may use various types of information from various information sources and may be sources of useful information. For example, without limitation, vehicle 114 may be configured to gather useful intelligence or other information as vehicle 114 flies through operational environment 100.

In accordance with an illustrative embodiment, soldiers 104, 106, and 108 may carry mobile devices 116, 118, and 120, respectively. Mobile devices 116, 118, and 120 may be handheld or other mobile communication devices. For example, without limitation, mobile devices 116, 118, and 120 may be cellular telephones or other handheld communication devices. As another example, mobile devices 116, 118, and 120 may be laptop or tablet computers or any other data processing devices that are configured as mobile communication devices. In any case, mobile devices 116, 118, and 120 may be configured to support wireless connectivity for communications to and from mobile devices 116, 118, and 120.

Mobile devices 122, 124, and 126 may be provided in vehicles 110, 112, and 114, respectively. Mobile devices 122, 124, and 126 may include any communications devices that are configured to support wireless connectivity for communications to and from mobile devices 122, 124, and 126. For example, without limitation, mobile devices 122, 124, and 126 may be any data processing devices or systems that are configured as wireless communications devices. Mobile devices 122, 124, and 126 may be parts of vehicles 110, 112, and 114, respectively, or may be separate from but carried on and removable from vehicles 110, 112, and 114. Mobile devices 122, 124, and 126 that are parts of vehicles 110, 112, and 114 are mobile because vehicles 110, 112, and 114 are mobile.

In this example, mobile device 122 on vehicle 110 may be configured to operate as an access point for a mobile network that includes mobile devices 116, 118, 120, and 122. Wireless connectivity may be established between mobile devices 116, 118, 120, and mobile device 122. For example, without limitation, Wi-Fi, cellular radio, or other wireless connectivity may be established between mobile devices 116, 118, 120, and mobile device 122. Mobile device 122 may be configured to exchange information with mobile devices 116, 118, and 120 via the wireless connectivity established between mobile device 122 and mobile devices 116, 118, and 120. Operating as an access point, mobile device 122 also may be configured to provide for the exchange of information between individual ones of mobile devices 116, 118, and 120 via mobile device 122.

In this example, mobile devices 116, 118, 120 and 122 may be referred to as user nodes for the mobile network that includes mobile devices 116, 118, 120 and 122. For purposes of the present application, including in the claims, a mobile network is a wireless network in which all of the network components are mobile.

Wireless connectivity also may be established between mobile device 122 and mobile devices 124 and 126. Any type of wireless connectivity may be used to provide for the wireless exchange of information between mobile device 122 and mobile devices 124 and 126. In one example, without limitation, one or both of mobile devices 124 and 126 may be additional user nodes for the mobile network that includes mobile devices 116, 118, 120 and 122.

As another example, without limitation, one or both of mobile devices 124 and 126 may be configured to operate as access points for other mobile networks in operational environment 100. Wireless connectivity between mobile devices 122, 124, and 126 configured as access points for different mobile networks may form a mesh of mobile networks. In this case, mobile devices 116, 118, and 120 may exchange information with any other mobile devices in any of the mobile networks in the mesh via mobile device 122, acting as an access point for the mobile network including mobile devices 116, 118, and 120, and either mobile device 124 or mobile device 126, acting as an access point for mobile devices in the other mobile networks in the mesh.

In accordance with an illustrative embodiment, wireless connectivity also may be established between mobile device 122, operating as an access point for a mobile network in operational environment 100, and number of other networks 128. Number of other networks 128 may include communications networks and other networks of data processing resources that may be located outside of operational environment 100. For example, without limitation, number of other networks 128 may include tactical radio networks, commercial data networks, cellular telephone networks, military or other government networks, or other communications or data networks or combinations of such networks. Any type of wireless connectivity may be used to provide for the wireless exchange of information between mobile device 122 and number of other networks 128. For example, without limitation, wireless connectivity may be established between mobile device 122, operating as an access point, and number of other networks 128 either directly or via communications satellite 130 or other intermediary devices or systems using any appropriate wireless communications media.

With wireless connectivity established between mobile device 122 and number of other networks 128, and mobile device 122 configured as an access point for a mobile network, mobile devices 116, 118, and 120 in the mobile network may exchange information with number of other networks 128 via mobile device 122. In this case, if mobile device 122 is also a part of a mesh of mobile networks, any mobile devices in the mesh may exchange information with number of other networks 128 via mobile device 122.

In accordance with an illustrative embodiment, mobile device 122, configured as an access point, may provide for the wireless exchange of information between mobile devices 116, 118, and 120 even if mobile device 122 is not connected to any other mobile network or to number of other networks 128. Mobile devices 116, 118, and 120 may exchange information with mobile devices in other mobile networks in a mesh of mobile networks via mobile device 122 if wireless connectivity is established between mobile device 122, operating as an access point, and one or both of mobile devices 124 and 126 operating as access points for other mobile networks in the mesh. Mobile devices 116, 118, and 120 may exchange information with number of other networks 128 via mobile device 122 if wireless connectivity is established between mobile device 122, operating as an access point, and number of other networks 128.

Mobile devices 116, 118, 120, and 122 may be selected to provide a desired level of bandwidth for the exchange of information between mobile devices 116, 118, and 120, between mobile devices 116, 118, and 120 and mobile devices in other mobile networks in operational environment 100, and between mobile devices 116, 118, and 120 and number of other networks 128, via mobile device 122 operating as an access point. For example, without limitation, mobile devices 116, 118, and 120 may be selected to receive and transmit audio information, still image information, video information, or other types of information or combinations of information in real-time or near real-time via mobile device 122 operating as an access point.

In one example, without limitation, command and control information or other information may be provided to soldier 104 using mobile device 116. Similarly, intelligence or other potentially useful information may be provided from soldier 104 using mobile device 116. Such information may be provided from or to another soldier in operational environment 100, such as soldier 106 using mobile device 118 or soldier 108 using mobile device 120. As another example, such information may be provided from or to another mobile device in another mobile network in operational environment 100. As a further example, such information may be provided from or to number of other networks 128 inside or outside of operational environment 100.

The exchange of information between soldier 104 using mobile device 116 and mobile devices in other mobile networks may depend upon the establishment of wireless connectivity between mobile device 122, operating as an access point, and access points in other mobile networks. The exchange of information between soldier 104 using mobile device 116 and number of other networks 128 may depend upon the establishment of wireless connectivity between mobile device 122, operating as an access point, and number of other networks 128. However, the exchange of information between soldier 104 using mobile device 116 and mobile devices 118 and 120 via mobile device 122, operating as an access point, may not require any connectivity to be established between mobile device 122 and any other mobile network or number of other networks 128. In accordance with an illustrative embodiment, mobile device 122 may be configured to identify mobile devices 116, 118, and 120 as user nodes that are allowed to connect to a mobile network and to control access to the mobile network by mobile devices 116, 118, and 120 without any connectivity established between mobile device 122 and any other mobile network or number of other networks 128.

In accordance with an illustrative embodiment, a user node in a mobile network in operational environment 100 may move to a different mobile network in operational environment 100 and receive similar service. For example, mobile device 116 may move out of the mobile network including mobile device 122 operating as an access point and join a mobile network including mobile device 124 operating as an access point. Such movement between mobile networks may occur, for example, if soldier 104 using mobile device 116 moves out of the range for wireless connectivity with mobile device 122 and is in the range for wireless connectivity with mobile device 124. As another example, such movement between mobile networks may occur if mobile device 122 is disabled or wireless connectivity to mobile device 122 is not available for some other reason and wireless connectivity between mobile device 116 and mobile device 124 is available. Movement between mobile networks in this manner may be dependent upon authorization of a mobile user node to move between mobile networks. For example, without limitation, soldiers using mobile devices connected to any mobile network within a brigade or other military unit may be authorized to move to any other mobile network in the unit and receive network services.

The illustration of FIG. 1 is not meant to imply physical or architectural limitations to the manner in which different illustrative embodiments may be implemented. Other components in addition to, in place of, or both in addition to and in place of the ones illustrated may be used. Some components may be unnecessary in some illustrative embodiments. For example, illustrative embodiments may feature more or fewer mobile devices, different mobile devices, and different configurations for wireless connectivity between mobile devices than are presented only as examples in FIG. 1.

Figure 2:
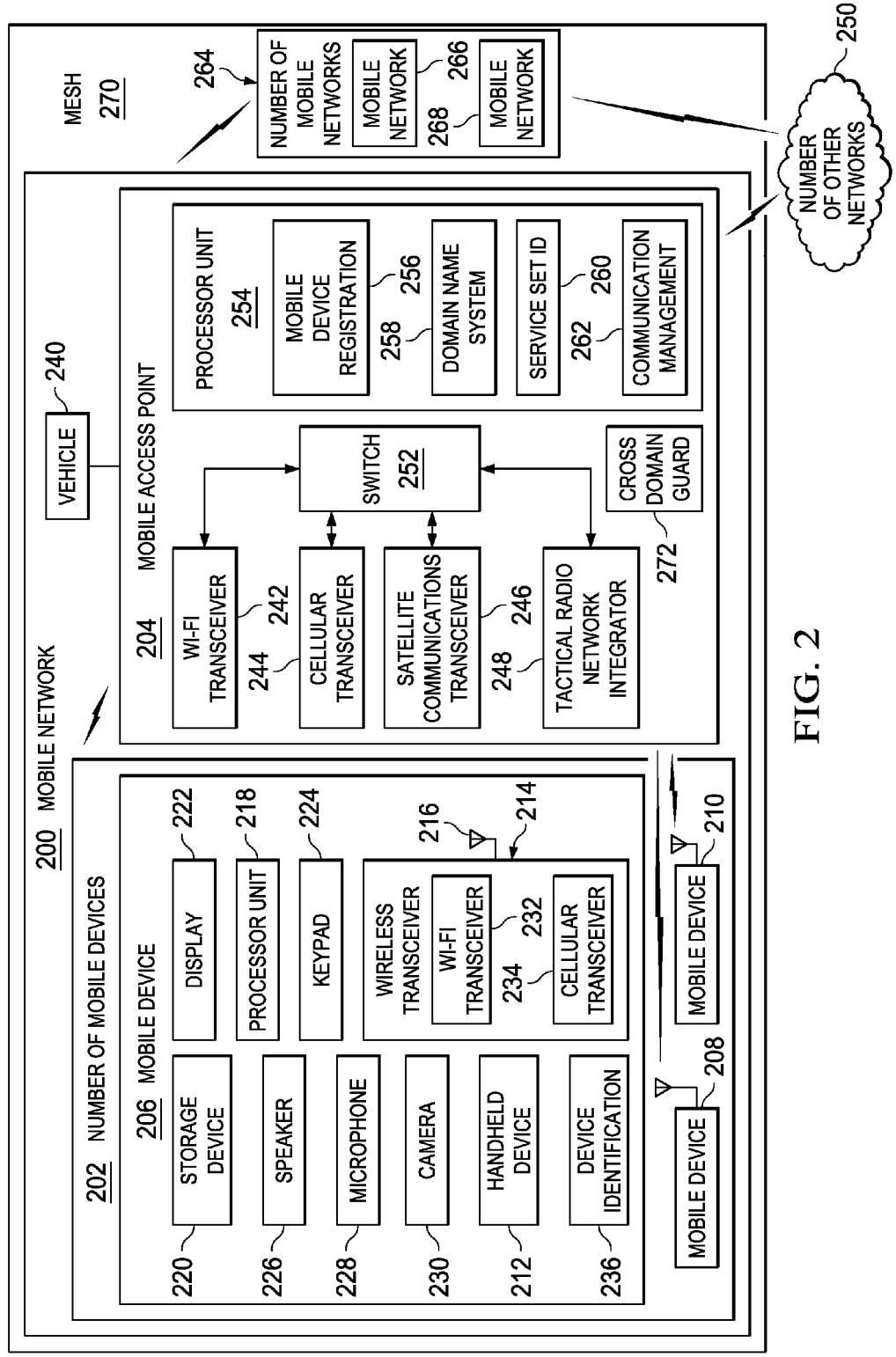
FIG. 2 is an illustration of a block diagram of a mobile network in accordance with an illustrative embodiment.

Turning now to FIG. 2, an illustration of a block diagram of a mobile network is depicted in accordance with an illustrative embodiment. In this example, mobile network 200 is an example of one implementation of a mobile network that may be used to provide communications for personnel and machines in operational environment 100 in FIG. 1 or in any other operational environment.

Mobile network 200 may include number of mobile devices 202 and mobile access point 204. For example, number of mobile devices 202 may include mobile device 206, mobile device 208, and mobile device 210. Number of mobile devices 202 may include more or fewer than three mobile devices. Mobile device 208 and mobile device 210 may be the same or different from each other and the same or different from mobile device 206.

Mobile device 206 may be handheld device 212. For example, without limitation, handheld device 212 may be a handheld cellular telephone or other handheld communication device. As another example, mobile device 206 may be a laptop, tablet, or other computer or other data processing device. Mobile device 206 may be configured to be carried by an individual or on a vehicle or other mobile machine. As another example, mobile device 206 may be a mobile autonomous machine that is configured to operate without a human operator. For example, without limitation, mobile device 206 may be a fully or partially autonomous mobile device such as an airborne or ground sensor such as a camera or other mobile sensor or other device or combination of mobile devices.

Mobile device 206 may be configured to send and receive information via a wireless communications link. Mobile device 206 also may be configured to present, acquire, and process various types of information in a number of ways. For example, without limitation, mobile device 206 may include wireless transceiver 214, antenna 216, processor unit 218, storage device 220, display 222, keypad 224, speaker 226, microphone 228, camera 230, or other components or combinations of components for providing a variety of functions.

Wireless transceiver 214 may be configured to provide for the wireless exchange of information between mobile device 206 and mobile access point 204. For example, without limitation, wireless transceiver 214 may be Wi-Fi transceiver 232, cellular transceiver 234, or a transceiver for sending and receiving information in any format and using any appropriate wireless communications protocol and radio frequency or other spectrum. For example, without limitation, cellular transceiver 234 may be configured to provide for the wireless exchange of information using a third generation, fourth generation, Long Term Evolution, WiMax, or other cellular communications standard.

Antenna 216 may be coupled to wireless transceiver 214. Antenna 216 may be selected as appropriate for the type of wireless communications provided by wireless transceiver 214.

Mobile device 206 may be configured to exchange information with mobile access point 204 via more than one type of wireless connection. In one example, without limitation, mobile device 206 may include more than one wireless transceiver 214, antenna 216, or both.

Processor unit 218 may be configured to perform various functions of mobile device 206. For example, without limitation, processor unit 218 may be configured to control the transmission and receipt of information by mobile device 206 via wireless transceiver 214. Processor unit 218 also may be configured to process information in a variety of ways either before such information is transmitted from mobile device 206 or after such information is received by mobile device 206, or both.

Storage device 220 may comprise a memory or other device or a number of devices for storing data used by processor unit 218. For example, storage device 220 may include program code that may be run by processor unit 218 to perform a number of functions. Storage device 220 may include information that has been received by mobile device 206 via wireless transceiver 214 or that will be transmitted from mobile device 206 via wireless transceiver 214, or both. Information stored in storage device 220 may be presented to a user on display 222 or speaker 226. Information stored in storage device 220 may be processed by processor unit 218 in a variety of ways.

Display 222 may be any display device for displaying text, graphics, still images, and video images to a user. Keypad 224 may be configured to receive input from a user. Input received from a user via keypad 224 may be provided to processor unit 218. Speaker 226 may be configured to provide for the presentation of audio information, including voice information, to a user. Microphone 228 provides for receiving audio information from a user. Camera 230 may be a still or video camera for capturing still images, video images, or both still and video images.

Mobile device 206 may include device identification 236. Device identification 236 may be stored in storage device 220 or at another location in mobile device 206. Device identification 236 may uniquely identify mobile device 206. Device identification 236 may be provided to mobile access point 204 to identify mobile device 206 to mobile access point 204 when mobile device 206 connects to mobile network 200 via mobile access point 204.

Mobile access point 204 may be implemented using any appropriate data processing device. For example, without limitation, mobile access point 204 may be implemented on a laptop or other computer. As another example, mobile access point 204 may be implemented as a device that is integrated with other communications equipment.

For example, without limitation, mobile access point 204 may be located on vehicle 240. Vehicle 240 may be a land vehicle, an air vehicle, a water vehicle, or a vehicle configured to operate in any combination of land, air, and water. Mobile access point 204 may be a part of vehicle 240 or may be removable from vehicle 240 for operation separate from vehicle 240. In either case, mobile access point 204 is mobile because vehicle 240 is mobile.

Mobile access point 204 may include a number of transceivers for providing wireless connectivity. For example, without limitation, mobile access point 204 may include Wi-Fi transceiver 242, cellular transceiver 244, and satellite communications transceiver 246. Wi-Fi transceiver 242 may be configured to exchange information wirelessly with mobile device 206 comprising Wi-Fi transceiver 232 via Wi-Fi. Cellular transceiver 244 may be configured to exchange information wirelessly with mobile device 206 comprising cellular transceiver 234 using wireless cellular radio communications. For example, without limitation, cellular transceiver 244 may be configured to exchange information with mobile device 206 using a third generation cellular communications standard, a fourth generation cellular communications standard, a Long Term Evolution cellular communications standard, WiMax, or any other appropriate cellular communications standard or combination of cellular communications standards.

Satellite communications transceiver 246 may be configured to exchange information with number of other networks 250 via a communications satellite. Number of other networks 250 may include remote communications and data networks. For example, without limitation, number of other networks 250 may include commercial networks, cellular telephone networks, military or other government networks, other data or communications networks, or combinations of such networks.

Mobile access point 204 also may include tactical radio network integrator 248. Alternatively, mobile access point 204 may be configured to be coupled to tactical radio network integrator 248 that is separate from mobile access point 204. For example, without limitation, tactical radio network integrator 248 may be located on vehicle 240 along with mobile access point 204. Tactical radio network integrator 248 may be configured to provide for the exchange of information with and between tactical radio devices and systems.

Wi-Fi transceiver 242, cellular transceiver 244, satellite communications transceiver 246, and tactical radio network integrator 248 may be connected to switch 252. Switch 252 may be connected to and controlled by processor unit 254.

Processor unit 254 may be configured to perform a number of functions in mobile access point 204. For example, without limitation, processor unit 254 may be configured to perform mobile device registration 256, to provide domain name system 258, to provide service set ID 260, and to provide communication management 262.

Mobile device registration 256 identifies number of mobile devices 202 that are allowed to be connected to mobile network 200. For example, mobile device registration 256 may use device identification 236 provided by mobile device 206 to identify mobile device 206 as a device that may be connected to mobile network 200. Only number of mobile devices 202 that are identified by mobile device registration 256 as being allowed to connect to mobile network 200 may be registered to mobile access point 204 by mobile device registration 256. Only number of mobile devices 202 that are registered to mobile access point 204 may exchange information with mobile access point 204. Therefore, unauthorized users may be prevented from gaining access to mobile network 200.

Mobile access point 204 may be configured to register number of mobile devices 202 to mobile access point 204 when mobile access point 204 is not connected to any other network. For example, in the case where mobile device 206 is a cellular telephone, mobile device registration 256 may be configured to register mobile device 206 to mobile access point 204 without accessing a remote cellular telephone network or remote database. Therefore, in accordance with an illustrative embodiment, mobile access point 204 may provide connectivity via cellular and other services independently of any external connectivity or fixed communications infrastructure.

Domain name system 258 may be configured to provide Internet Protocol addresses for number of mobile devices 202 in mobile network 200. Domain name system 258 is provided locally in mobile access point 204 so that Internet Protocol addresses may be provided for number of mobile devices 202 in mobile network 200 even when mobile access point 204 is not connected to any other network. Therefore, information may be exchanged with and between number of mobile devices 202 using Internet Protocol addresses without requiring access to a remote domain name system by mobile network 200.

Service set ID 260 may be a specific service set ID for mobile network 200 comprising number of mobile devices 202 and mobile access point 204. Service set ID 260 also may include a service set ID for one or more additional levels of data networks that include mobile network 200 along with a number of other networks.

Communication management 262 may comprise controlling switch 252 to provide for the exchange of information with and between number of mobile devices 202. For example, without limitation, communication management 262 may include establishing voice over Internet Protocol communications with and between number of mobile devices 202.

Mobile access point 204 may be configured to establish wireless connectivity with number of mobile networks 264. For example, number of mobile networks 264 may include mobile network 266 and mobile network 268. Number of mobile networks 264 may include more or fewer than two mobile networks. Mobile network 266 and mobile network 268 may be implemented in a similar manner to mobile network 200. For example, each of mobile network 266 and mobile network 268 may comprise a mobile access point that provides wireless connectivity to a number of mobile devices. For example, without limitation, mobile access point 204 may establish wireless connectivity with number of mobile networks 264 via Wi-Fi transceiver 242. In this case, information may be exchanged between mobile network 200 and number of mobile networks 264 via Wi-Fi.

Mobile network 200 and number of mobile networks 264 may form mesh 270. Thus, mesh 270 may be referred to as a network of networks. Any communication device connected to mobile network 200 or number of mobile networks 264 may exchange information with any other communication device connected to mobile network 200 or number of mobile networks 264 via mesh 270. Furthermore, mesh 270 provides for sharing of resources between mobile network 200 and number of mobile networks 264. For example, without limitation, if any one mobile network in mesh 270 can establish a satellite communications link, any devices in any of mobile network 200 and number of mobile networks 264 may access that link via mesh 270.

Mobile network 200 may be a network in a first security domain. For example, without limitation, mobile network 200 may be an unclassified network or a network in another security domain. Cross domain guard 272 may be provided at mobile access point 204 to provide for the exchange of information between number of mobile devices 202 in various security domains. Cross domain guard 272 may be configured to provide for the exchange of information between number of mobile devices 202 in a first security domain and a different second security domain to which number of mobile devices 202 are connected by mobile access point 204. For example, without limitation, the first security domain may be an unclassified security domain and the second security domain may be a classified security domain. Cross domain guard 272 may be referred to as a cross-domain solution.

The illustration of FIG. 2 is not meant to imply physical or architectural limitations to the manner in which different illustrative embodiments may be implemented. Other components in addition to, in place of, or both in addition to and in place of the ones illustrated may be used. Some components may be unnecessary in some illustrative embodiments. Also, the blocks are presented to illustrate some functional components. One or more of these blocks may be combined or divided into different blocks when implemented in different illustrative embodiments.

Figure 3:
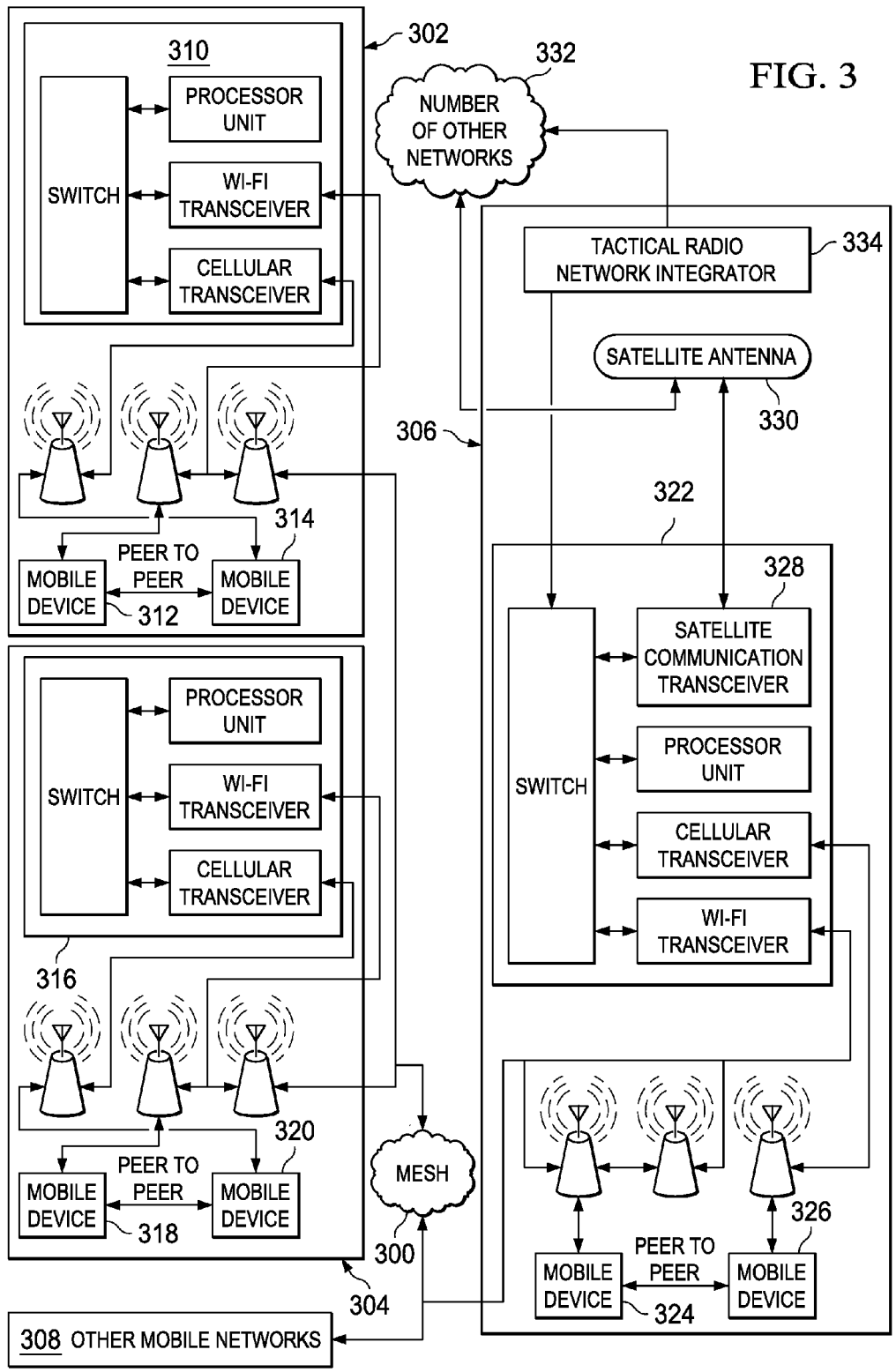
FIG. 3 is an illustration of a mesh of mobile networks in accordance with an illustrative embodiment.

Turning now to FIG. 3, an illustration of a mesh of mobile networks is depicted in accordance with an illustrative embodiment. In this example, mesh 300 is an example of mesh 270 in FIG. 2.

In this example, mesh 300 comprises mobile network 302, mobile network 304, mobile network 306, and other mobile networks 308. Mobile network 302 comprises mobile access point 310 and mobile devices 312 and 314 wirelessly connected to mobile network 302. Mobile network 304 comprises mobile access point 316 and mobile devices 318 and 320 wirelessly connected to mobile access point 316. Mobile network 306 comprises mobile access point 322 and mobile devices 324 and 326 wirelessly connected to mobile access point 322. Mobile access points 310, 316, and 322 and other mobile networks 308 are connected together via wireless connectivity to form mesh 300.

In this example, mobile access point 322 in mobile network 306 includes satellite communications transceiver 328 connected to satellite antenna 330. Mobile access point 322 may exchange information with number of other networks 332 via a communications satellite using satellite communications transceiver 328 and satellite antenna 330. Mobile access point 322 in mobile network 306 also may be connected to tactical radio network integrator 334. Mobile access point 322 may exchange data with tactical radio networks in number of other networks 332 via tactical radio network integrator 334.

In accordance with an illustrative embodiment, any communication device in any mobile network that is part of mesh 300 may exchange information with any other communication device in any mobile network that is part of mesh 300. Furthermore, any communication device in any mobile network that is part of mesh 300 may exchange information with number of other networks 332 via mobile access point 322 in mobile network 306. Thus, mesh 300 in accordance with an illustrative embodiment may provide robust connectivity on local and distributed networks.

Figure 4:
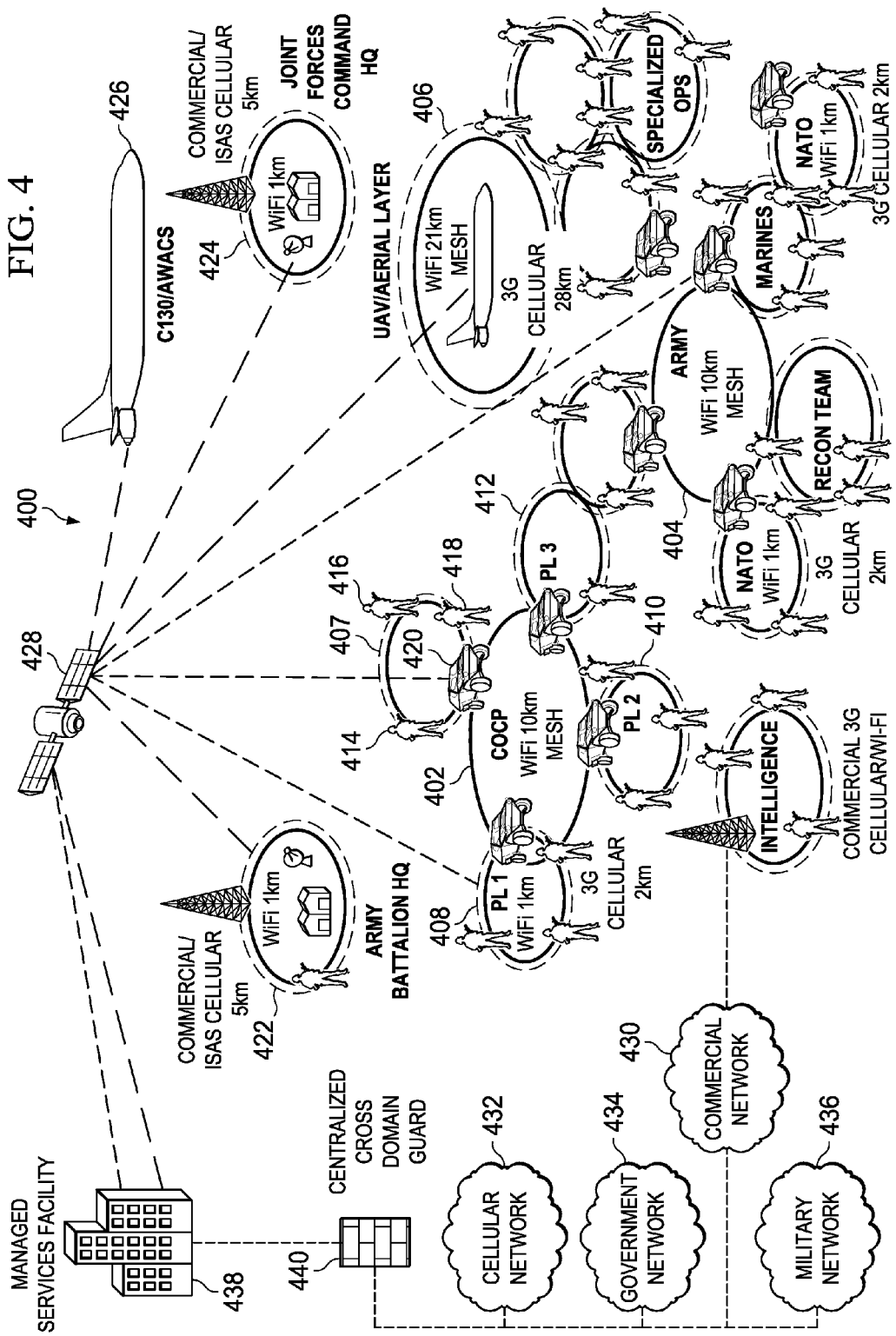
FIG. 4 is an illustration of a communications network architecture in accordance with an illustrative embodiment.

Turning now to FIG. 4, an illustration of a communications network architecture is depicted in accordance with an illustrative embodiment. The dashed and solid lines between the various components in FIG. 4 indicate various communications links between the components of the communications network architecture. For example, without limitation, these various communications links may include local area network, WiFi, cellular radio, and satellite communications links, as described above.

In this example, architecture 400 includes mesh 402, mesh 404, and mesh 406. Mesh 402, mesh 404, and mesh 406 are examples of implementations of mesh 270 in FIG. 2. Each of mesh 402, 404, and 406 comprises a number of mobile networks. For example, mesh 402 comprises mobile networks 407, 408, 410, and 412. In this example, mobile network 407 includes mobile devices carried by soldiers 414, 416, and 418 and a mobile access point on vehicle 420.

Each mesh 402, 404, and 406 may be connected to headquarters 422, headquarters 424, and airborne warning and control system 426 via communications satellite 428. Each mesh 402, 404, and 406 also may be connected to commercial network 430, cellular network 432, government network 434, and military network 436 via communications satellite 428. Managed services facility 438 may assure connectivity to external networks, such as commercial network 430, cellular network 432, government network 434, and military network 436, and may determine the level of connectivity and services down to the individual level. Centralized cross domain guard 440 may provide for the exchange of data between different security domains in architecture 400.

Figure 5:
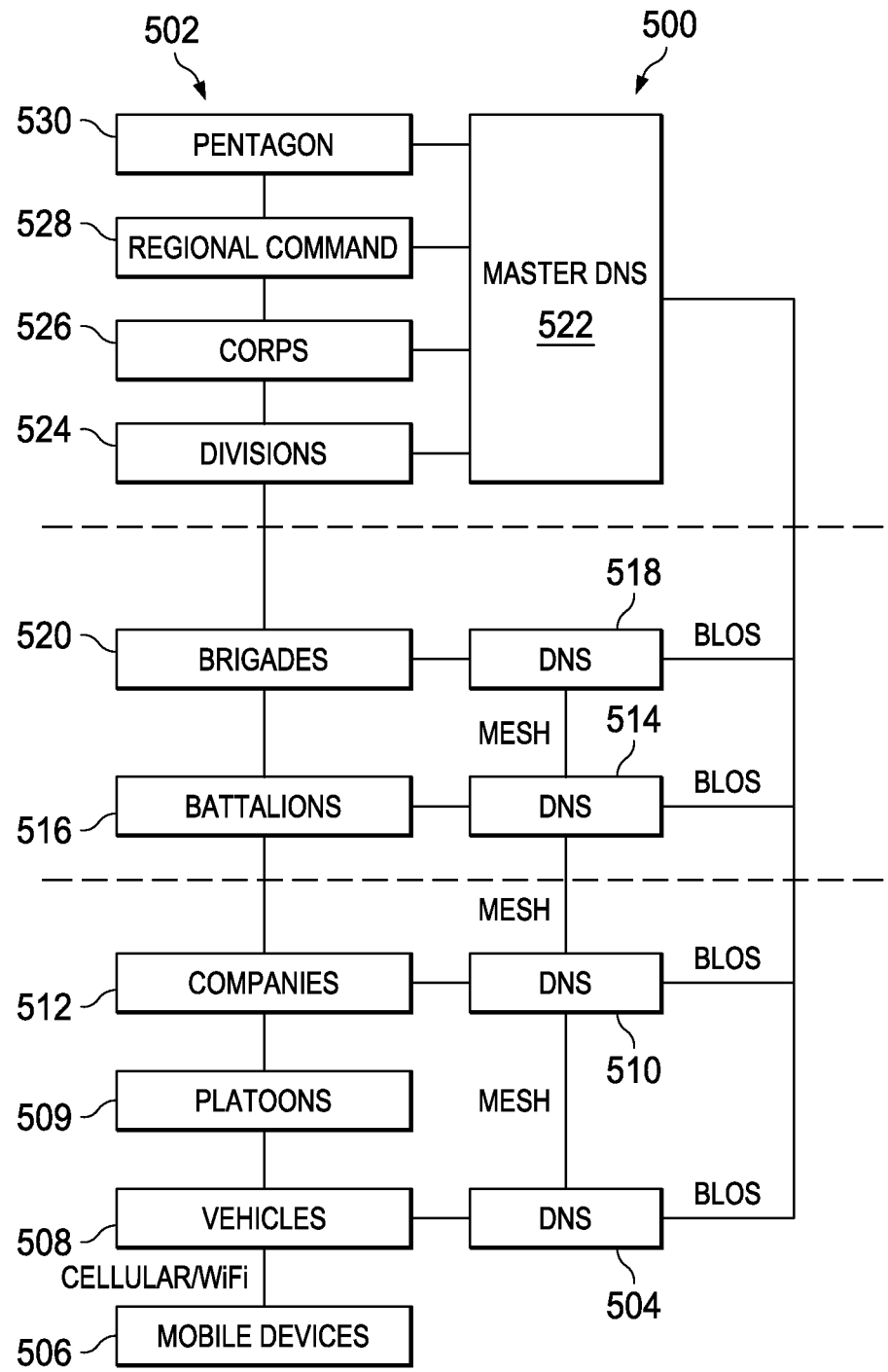
FIG. 5 is an illustration of a domain name system architecture in accordance with an illustrative embodiment.

Turning now to FIG. 5, an illustration of a domain name system architecture is depicted in accordance with an illustrative embodiment. Domain name system architecture 500 is an example of a multiple level domain name system architecture for military organization 502. A similar architecture may be used for other organizations that have a similar hierarchical organizational structure. Domain name system architecture 500 allows a flexible allocation of managed Internet Protocol space. For example, domain name system architecture 500 may support a larger number of mobile devices than static Internet Protocol addressing schemes currently employed by military organizations.

In this example, domain name system 504 provides Internet Protocol addresses for mobile devices 506 that are wirelessly connected to mobile access points in vehicles 508. For example, domain name system 504 may be provided in the mobile access points in vehicles 508. In this example, domain name system 504 is an example of domain name system 258 in FIG. 2. Mobile devices 506 and vehicles 508 may be resources assigned to platoons 509 in military organization 502.

Domain name system 510 may be provided at a higher level in military organization 502. For example, domain name system 510 may be provided at the level of companies 512 in military organization 502. Continuing up the organizational structure of military organization 502, domain name system 514 may be provided at the level of battalions 516 and domain name system 518 may be provided at the level of brigades 520 in military organization 502. Master domain name system 522 may be provided at the highest levels of military organization 502. For example, master domain name system 522 may be provided at the level of divisions 524, corps 526, regional command 528, or Pentagon 530.

Changes to the various levels of domain name system architecture 500 may be provided from master domain name system 522 via a satellite communications link or other link, when available. For example, changes to domain name system 504 at the level of a mobile network in accordance with an illustrative embodiment may be made via a satellite communications link or other link to a mobile access point, when available.

Figure 6:
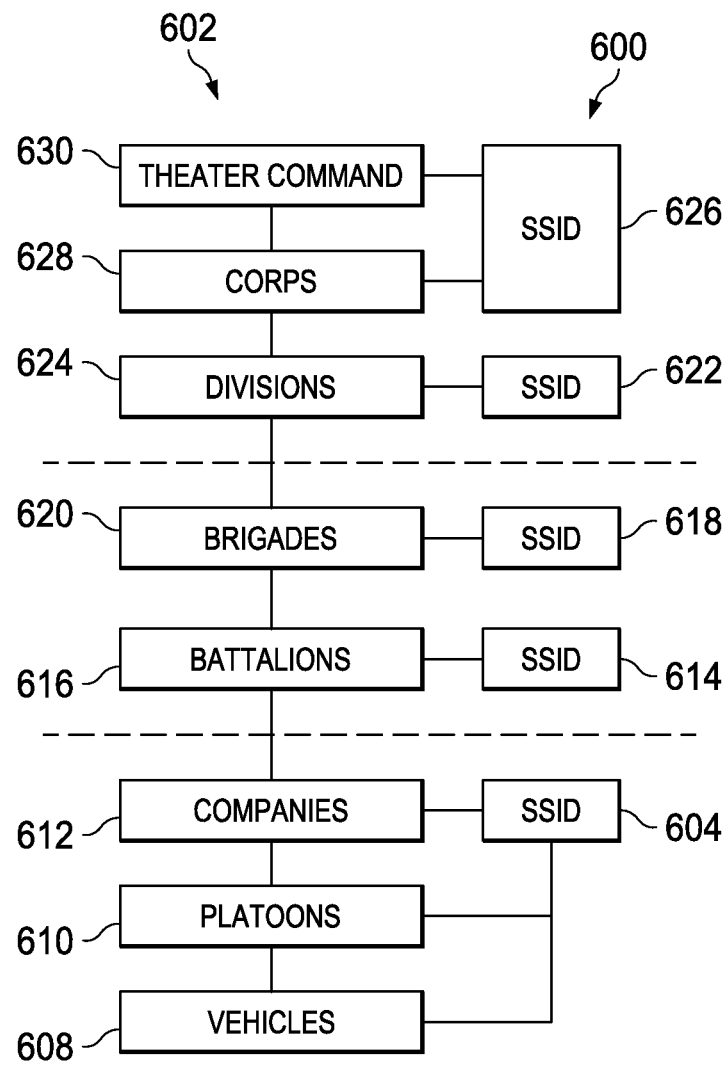
FIG. 6 is an illustration of a service set ID architecture in accordance with an illustrative embodiment.

Turning now to FIG. 6, an illustration of a service set ID architecture is depicted in accordance with an illustrative embodiment. In this example, service set ID architecture 600 is an example of a multiple level service set ID architecture for military organization 602. A similar architecture may be used for other organizations that have a similar hierarchical organizational structure. The logical addressing scheme provided by service set ID architecture 600 allows for Layer 3 services to appropriately manage and segregate data types to assure traffic throughput.

In this example, service set ID 604 may be provided for networks at the lowest levels of military organization 602. For example, service set ID 604 may be provided for mobile networks including access points in vehicles 608. In this case, service set ID 604 is an example of service set ID 260 in FIG. 2. Vehicles 608 may be resources assigned to platoons 610 and companies 612. Service set ID 604 also may be provided for networks at the level of platoons 610 or companies 612 in military organization 602.

Continuing up the organizational structure of military organization 602, service set ID 614 may be provided for networks at the level of battalions 616 in military organization 602 that include networks at lower levels. Service set ID 618 may be provided for networks at the level of brigades 620 in military organization 602 that include networks at lower levels. Service set ID 622 may be provided for networks at the level of divisions 624 in military organization 602 that include networks at lower levels. Service set ID 626 may be provided for networks at the corps 628 or theater command 630 levels in military organization 602 that include networks at lower levels.

Turning now to FIG. 7, an illustration of a data processing system is depicted in accordance with an illustrative embodiment. In this example, data processing system 700 is an example of one implementation of a data processing system for implementing mobile access point 204 or mobile device 206 in FIG. 2.

In this illustrative example, data processing system 700 includes communications fabric 702. Communications fabric 702 provides communications between processor unit 704, memory 706, persistent storage 708, communications unit 710, input/output (I/O) unit 712, and display 714. Memory 706, persistent storage 708, communications unit 710, input/output (I/O) unit 712, and display 714 are examples of resources accessible by processor unit 704 via communications fabric 702.

Processor unit 704 serves to run instructions for software that may be loaded into memory 706. Processor unit 704 may be a number of processors, a multi-processor core, or some other type of processor, depending on the particular implementation. Further, processor unit 704 may be implemented using a number of heterogeneous processor systems in which a main processor is present with secondary processors on a single chip. As another illustrative example, processor unit 704 may be a symmetric multi-processor system containing multiple processors of the same type.

Memory 706 and persistent storage 708 are examples of storage devices 716. A storage device is any piece of hardware that is capable of storing information, such as, for example, without limitation, data, program code in functional form, and other suitable information either on a temporary basis or a permanent basis. Storage devices 716 also may be referred to as computer readable storage devices in these examples. Memory 706, in these examples, may be, for example, a random access memory or any other suitable volatile or non-volatile storage device. Persistent storage 708 may take various forms, depending on the particular implementation.

For example, persistent storage 708 may contain one or more components or devices. For example, persistent storage 708 may be a hard drive, a flash memory, a rewritable optical disk, a rewritable magnetic tape, or some combination of the above. The media used by persistent storage 708 also may be removable. For example, a removable hard drive may be used for persistent storage 708.

Communications unit 710, in these examples, provides for communications with other data processing systems or devices. In these examples, communications unit 710 is a network interface card. Communications unit 710 may provide communications through the use of either or both physical and wireless communications links.

Input/output unit 712 allows for input and output of data with other devices that may be connected to data processing system 700. For example, input/output unit 712 may provide a connection for user input through a keyboard, a mouse, and/or some other suitable input device. Further, input/output unit 712 may send output to a printer. Display 714 provides a mechanism to display information to a user.

Instructions for the operating system, applications, and/or programs may be located in storage devices 716, which are in communication with processor unit 704 through communications fabric 702. In these illustrative examples, the instructions are in a functional form on persistent storage 708. These instructions may be loaded into memory 706 for execution by processor unit 704. The processes of the different embodiments may be performed by processor unit 704 using computer-implemented instructions, which may be located in a memory, such as memory 706.

These instructions are referred to as program instructions, program code, computer usable program code, or computer readable program code that may be read and executed by a processor in processor unit 704. The program code in the different embodiments may be embodied on different physical or computer readable storage media, such as memory 706 or persistent storage 708.

Program code 718 is located in a functional form on computer readable media 720 that is selectively removable and may be loaded onto or transferred to data processing system 700 for execution by processor unit 704. Program code 718 and computer readable media 720 form computer program product 722 in these examples. In one example, computer readable media 720 may be computer readable storage media 724 or computer readable signal media 726.

Computer readable storage media 724 may include, for example, an optical or magnetic disk that is inserted or placed into a drive or other device that is part of persistent storage 708 for transfer onto a storage device, such as a hard drive, that is part of persistent storage 708. Computer readable storage media 724 also may take the form of a persistent storage, such as a hard drive, a thumb drive, or a flash memory, that is connected to data processing system 700. In some instances, computer readable storage media 724 may not be removable from data processing system 700.

In these examples, computer readable storage media 724 is a physical or tangible storage device used to store program code 718 rather than a medium that propagates or transmits program code 718. Computer readable storage media 724 is also referred to as a computer readable tangible storage device or a computer readable physical storage device. In other words, computer readable storage media 724 is a media that can be touched by a person.

Alternatively, program code 718 may be transferred to data processing system 700 using computer readable signal media 726. Computer readable signal media 726 may be, for example, a propagated data signal containing program code 718. For example, computer readable signal media 726 may be an electromagnetic signal, an optical signal, and/or any other suitable type of signal. These signals may be transmitted over communications links, such as wireless communications links, optical fiber cable, coaxial cable, a wire, and/or any other suitable type of communications link. In other words, the communications link and/or the connection may be physical or wireless in the illustrative examples.

In some illustrative embodiments, program code 718 may be downloaded over a network to persistent storage 708 from another device or data processing system through computer readable signal media 726 for use within data processing system 700. For instance, program code stored in a computer readable storage medium in a server data processing system may be downloaded over a network from the server to data processing system 700. The data processing system providing program code 718 may be a server computer, a client computer, or some other device capable of storing and transmitting program code 718.

The different components illustrated for data processing system 700 are not meant to provide architectural limitations to the manner in which different embodiments may be implemented. The different illustrative embodiments may be implemented in a data processing system including components in addition to and/or in place of those illustrated for data processing system 700. Other components shown in FIG. 7 can be varied from the illustrative examples shown. The different embodiments may be implemented using any hardware device or system capable of running program code. As one example, data processing system 700 may include organic components integrated with inorganic components and/or may be comprised entirely of organic components excluding a human being. For example, a storage device may be comprised of an organic semiconductor.

In another illustrative example, processor unit 704 may take the form of a hardware unit that has circuits that are manufactured or configured for a particular use. This type of hardware may perform operations without needing program code to be loaded into a memory from a storage device to be configured to perform the operations.

For example, when processor unit 704 takes the form of a hardware unit, processor unit 704 may be a circuit system, an application specific integrated circuit (ASIC), a programmable logic device, or some other suitable type of hardware configured to perform a number of operations. With a programmable logic device, the device is configured to perform the number of operations. The device may be reconfigured at a later time or may be permanently configured to perform the number of operations. Examples of programmable logic devices include, for example, a programmable logic array, a programmable array logic, a field programmable logic array, a field programmable gate array, and other suitable hardware devices. With this type of implementation, program code 718 may be omitted, because the processes for the different embodiments are implemented in a hardware unit.

In still another illustrative example, processor unit 704 may be implemented using a combination of processors found in computers and hardware units. Processor unit 704 may have a number of hardware units and a number of processors that are configured to run program code 718. With this depicted example, some of the processes may be implemented in the number of hardware units, while other processes may be implemented in the number of processors.

In another example, a bus system may be used to implement communications fabric 702 and may be comprised of one or more buses, such as a system bus or an input/output bus. Of course, the bus system may be implemented using any suitable type of architecture that provides for a transfer of data between different components or devices attached to the bus system.

Additionally, communications unit 710 may include a number of devices that transmit data, receive data, or both transmit and receive data. Communications unit 710 may be, for example, a modem or a network adapter, two network adapters, or some combination thereof. Further, a memory may be, for example, memory 706, or a cache, such as that found in an interface and memory controller hub that may be present in communications fabric 702.

The flowcharts and block diagrams described herein illustrate the architecture, functionality, and operation of possible implementations of systems, methods, and computer program products according to various illustrative embodiments. In this regard, each block in the flowcharts or block diagrams may represent a module, segment, or portion of code, which comprises one or more executable instructions for implementing the specified logical function or functions. It should also be noted that, in some alternative implementations, the functions noted in a block may occur out of the order noted in the figures. For example, the functions of two blocks shown in succession may be executed substantially concurrently, or the functions of the blocks may sometimes be executed in the reverse order, depending upon the functionality involved.

The description of the different illustrative embodiments has been presented for purposes of illustration and description and is not intended to be exhaustive or to limit the embodiments in the form disclosed. Many modifications and variations will be apparent to those of ordinary skill in the art.

Further, different illustrative embodiments may provide different benefits as compared to other illustrative embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A communication system, comprising:
a mobile access point configured to exchange information wirelessly with a number of mobile devices and to control a wireless exchange of information between the number of mobile devices via the mobile access point, wherein the mobile access point is on a military vehicle, wherein the military vehicle is a resource of a military unit comprising military personnel; and
a cross domain guard configured to exchange information between a first security domain comprising the mobile access point and the number of mobile devices and a second security domain, wherein the first security domain comprises an unclassified government security domain and the second security domain comprises a classified government security domain.

2. The communication system of claim 1, wherein the military personnel comprise soldiers.

3. The communication system of claim 2, wherein another mobile device is configured to operate as the mobile access point and is a part of a vehicle.

4. The communication system of claim 2, wherein the mobile access point is configured to exchange the information wirelessly with the number of mobile devices via a plurality of wireless connections comprising Wi-Fi, communications satellite, tactical radio, and cellular radio.

5. The communication system of claim 2, wherein the mobile access point is configured to exchange the information wirelessly with the number of mobile devices using a cellular communications standard selected from a third generation cellular communications standard, a fourth generation cellular communications standard, a Long Term Evolution cellular communications standard, and WiMax.

6. The communication system of claim 2, wherein the mobile access point is configured to provide a domain name system for providing Internet Protocol addresses for the number of mobile devices and to not allow other mobile devices that are not registered to the domain name system to exchange information with the mobile access point.

7. The communication system of claim 2, wherein the mobile access point is configured to provide a service set ID for a mobile wireless network comprising the mobile access point and the number of mobile devices.

8. The communication system of claim 2, wherein the mobile access point is configured to exchange information with a number of other networks and to control an exchange of information between the number of mobile devices and the number of other networks via the mobile access point.

9. The communication system of claim 2, wherein the number of mobile devices and the mobile access point comprise a mobile network and wherein the mobile access point is further configured to exchange information wirelessly between the mobile network and a number of other mobile networks to form a mesh of mobile networks.

10. A method of a communication system, comprising:
exchanging, via a mobile access point, information wirelessly with a number of mobile devices, wherein the mobile access point is on a military vehicle, wherein the military vehicle is a resource of a military unit comprising military personnel;
controlling a wireless exchange of information between the number of mobile devices via the mobile access point; and
exchanging, via a cross domain guard of the mobile access point, information between a first security domain comprising the mobile access point and the number of mobile devices and a second security domain, wherein the first security domain comprises an unclassified government security domain and the second security domain comprises a classified government security domain.

11. The method of claim 10, wherein the military personnel comprise soldiers.

12. The method of claim 11, wherein another mobile device is configured to operate as the mobile access point and is a part of a vehicle.

13. The method of claim 11, further comprising:
exchanging, via the mobile access point, the information wirelessly with the number of mobile devices via a plurality of wireless connections comprising Wi-Fi, communications satellite, tactical radio, and cellular radio.

14. The method of claim 11, further comprising:
exchanging, via the mobile access point, the information wirelessly with the number of mobile devices using a cellular communications standard selected from a third generation cellular communications standard, a fourth generation cellular communications standard, a Long Term Evolution cellular communications standard, and WiMax.

15. The method of claim 11, further comprising:
providing, via the mobile access point, a domain name system for providing Internet Protocol addresses for the number of mobile devices; and
preventing other mobile devices that are not registered to the domain name system from exchanging information with the mobile access point.

16. The method of claim 11, further comprising:
providing, via mobile access point, a service set ID for a mobile wireless network comprising the mobile access point and the number of mobile devices.

17. The method of claim 11, further comprising:
exchanging, via the mobile access point, information with a number of other networks; and
controlling an exchange of information between the number of mobile devices and the number of other networks via the mobile access point.

18. The method of claim 11, further comprising:
exchanging, via the mobile access point, information wirelessly between a mobile network and a number of other mobile networks to form a mesh of mobile networks;
wherein the number of mobile devices and the mobile access point comprise the mobile network.

\* \* \* \* \*